(12) United States Patent  (10) Patent No.: US 8,690,721 B2
McCune  (45) Date of Patent: Apr. 8, 2014

(54) JOURNAL PIN OIL SUPPLY FOR GEAR SYSTEM

(75) Inventor: Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 229 days.

(21) Appl. No.: 13/196,114

(22) Filed: Aug. 2, 2011

(65) Prior Publication Data

US 2013/0035190 A1   Feb. 7, 2013

(51) Int. Cl.
*F16H 1/48*   (2006.01)
*F16H 57/04*   (2010.01)

(52) U.S. Cl.
USPC ............................ 475/159; 475/331; 475/346

(58) Field of Classification Search
USPC .................................. 475/160, 159, 331, 346
See application file for complete search history.

(56) References Cited

U.S. PATENT DOCUMENTS

| | | | | |
|---|---|---|---|---|
| 4,883,367 | A * | 11/1989 | Maruyama | 384/114 |
| 5,102,379 | A | 4/1992 | Pagluica et al. | |
| 5,482,380 | A | 1/1996 | Corratti et al. | |
| 6,056,509 | A * | 5/2000 | Nakayama et al. | 416/128 |
| 7,883,438 | B2 | 2/2011 | McCune | |
| 8,215,454 | B2 * | 7/2012 | Portlock et al. | 184/6.12 |
| 8,398,517 | B2 * | 3/2013 | McCune et al. | 475/159 |
| 2008/0006018 | A1 * | 1/2008 | Sheridan et al. | 60/39.1 |
| 2008/0268997 | A1 * | 10/2008 | Gooden | 475/160 |
| 2010/0105516 | A1 * | 4/2010 | Sheridan et al. | 475/346 |
| 2010/0317477 | A1 * | 12/2010 | Sheridan et al. | 475/159 |
| 2010/0317478 | A1 * | 12/2010 | McCune et al. | 475/159 |
| 2012/0108380 | A1 * | 5/2012 | Dinter et al. | 475/159 |
| 2012/0260623 | A1 * | 10/2012 | McCune et al. | 60/226.1 |
| 2013/0051984 | A1 * | 2/2013 | McCune et al. | 415/122.1 |

FOREIGN PATENT DOCUMENTS

| | | |
|---|---|---|
| EP | 1876338 | 1/2008 |
| EP | 1925855 | 5/2008 |
| EP | 1925856 | 5/2008 |
| EP | 2264336 | 12/2010 |
| EP | 2267338 | 12/2010 |
| EP | 2270361 | 1/2011 |
| EP | 2383480 | 11/2011 |
| JP | 2009197821 | 9/2009 |

OTHER PUBLICATIONS

EP Search Report for European Patent Application No. 12178865.7-1753 completed on Apr. 11, 2013.

* cited by examiner

*Primary Examiner* — Sherry Estremsky
*Assistant Examiner* — Lillian Nguyen
(74) *Attorney, Agent, or Firm* — Carlson, Gaskey & Olds, P.C.

(57) ABSTRACT

An example journal pin includes a generally cylindrical body disposed on an axis having a supply passage. A first chamber and a second chamber are disposed in the generally cylindrical body and are in fluid communication with the supply passage. A recess on an outer diameter of the cylindrical body is in fluid communication with the first chamber and the second chamber. The first chamber and second chamber are each radially outward of the supply passage and including an outlet to the recess. The first chamber and second chamber each have a first section radially inward of a second section. A cross sectional area of the second section is greater than a cross sectional area of the corresponding first section.

26 Claims, 5 Drawing Sheets

202 → 204: SUPPORTING A FIRST INTERMEDIATE GEAR WITH A JOURNAL PIN HAVING A SUPPLY PASSAGE IN FLUID COMMUNICATION WITH A RECESS THROUGH A FIRST CHAMBER AND A SECOND CHAMBER, WHEREIN THE FIRST CHAMBER AND SECOND CHAMBER ARE EACH RADIALLY OUTWARD OF THE SUPPLY PASSAGE, EACH OF THE FIRST CHAMBER AND SECOND CHAMBER HAVING A FIRST SECTION RADIALLY INWARD OF A SECOND SECTION, WHEREIN A CROSS SECTIONAL AREA OF THE SECOND SECTION IS GREATER THAN A CROSS SECTIONAL AREA OF THE FIRST SECTION

206: ORIENTING THE JOURNAL PIN SUCH THAT THE RECESS IS CIRCUMFERENTIALLY OFFSET FROM A LOAD PLANE OF THE JOURNAL PIN.

FIG.6

JOURNAL PIN OIL SUPPLY FOR GEAR SYSTEM

BACKGROUND

This disclosure relates to a gear system and, in particular, to journal pins in an epicyclic gear system.

Turbomachines, such as gas turbine engines, typically propel aircraft and include a fan section, a turbine section, a compressor section, and a combustor section. Turbomachines may employ an epicyclic gear system connecting the fan section and the turbine section. Journal pins hold planet (or star) gears between the sun gear and a ring gear. The journal pins connect the planet gears to a gear carrier.

A single oil supply opening can supply outer surfaces of journal pins with oil to be distributed between the journal pin and the planet gears for lubrication. However, the use of a single supply opening necessitates an increased supply of oil, as well as increased oil pressure within the journal pin, for proper oil distribution. A single supply opening is also subject to blockage, resulting in bearing failure.

SUMMARY

An example journal pin includes a generally cylindrical body disposed on an axis having a supply passage. A first chamber and a second chamber are disposed in the generally cylindrical body and are in fluid communication with the supply passage. A recess on an outer diameter of the cylindrical body is in fluid communication with the first chamber and the second chamber. The first chamber and second chamber are each radially outward of the supply passage and including an outlet to the recess. The first chamber and second chamber each have a first section radially inward of a second section. A cross sectional area of the second section is greater than a cross sectional area of the corresponding first section.

An example turbomachine epicyclic gear system includes a sun gear rotatable around an axis, a ring gear radially outward of the sun gear, and a plurality of intermediate gears meshed with the sun gear and the ring gear. A plurality of journal pins are each configured to support one of the plurality of intermediate gears. Each of the plurality of journal pins has a supply passage in fluid communication with a recess disposed on the outer circumference of each journal pin through a first chamber and a second chamber. The first chamber and second chamber are each radially outward of the supply passage and have an outlet to the recess. Each of the first chamber and second chamber have a first section radially inward of a second section. A cross sectional area of the second section is greater than a cross sectional area of the corresponding first section.

An example method of installing an epicyclic gear system in a turbomachine includes supporting a first intermediate gear with a journal pin having a supply passage in fluid communication with a recess through a first chamber and a second chamber. The first chamber and second chamber are each radially outward of the supply passage. Each of the first chamber and second chamber have a first section radially inward of a second section. A cross sectional area of the second section is greater than a cross sectional area of the corresponding first section. The journal pin is oriented such that the recess is circumferentially offset from a load plane of the journal pin.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 6 shows an example method of installing an epicyclic gear system.

DETAILED DESCRIPTION

Figure 1:
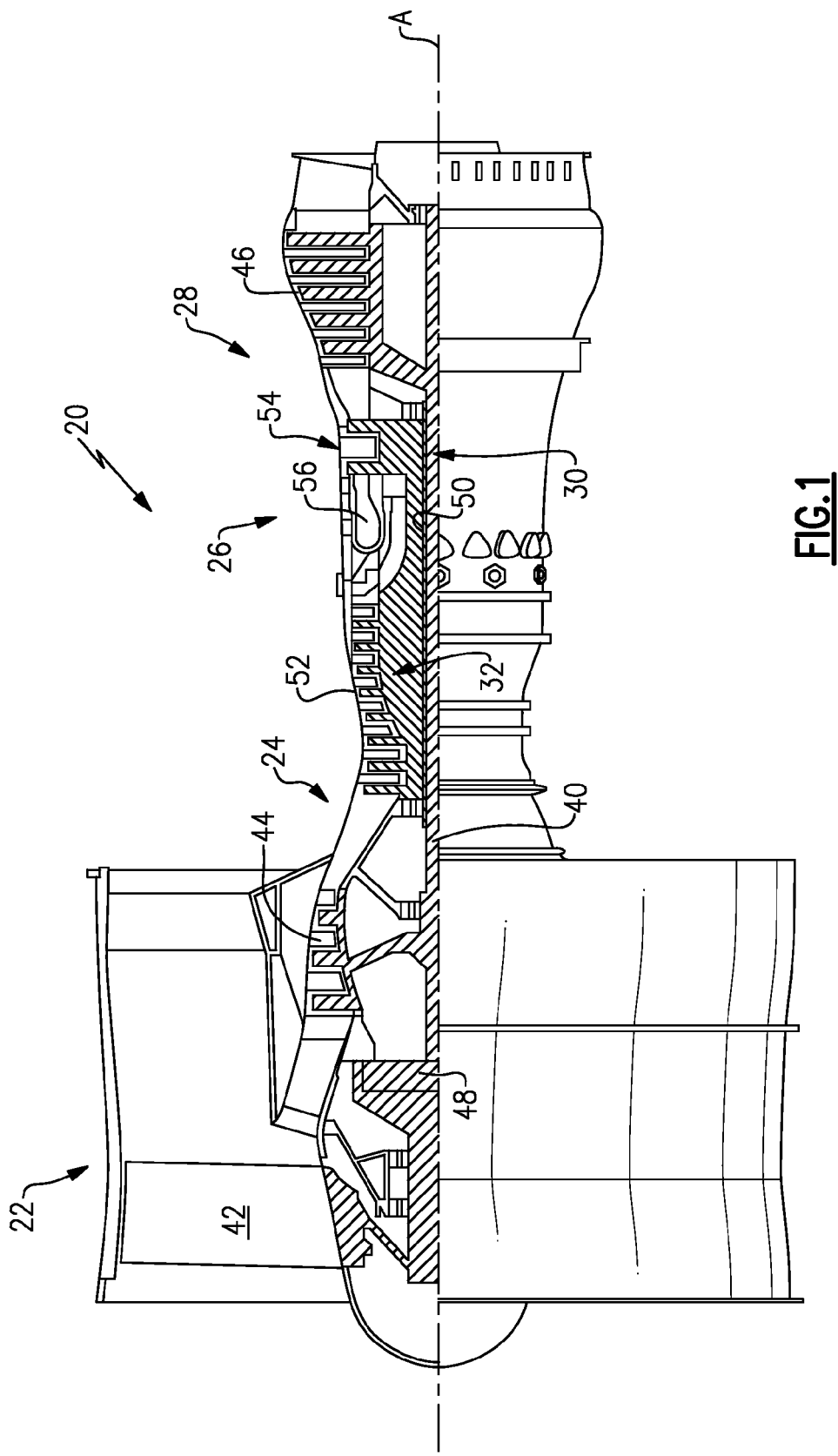
FIG. 1 is a schematic cross-section of a turbomachine.

FIG. 1 schematically illustrates a gas turbine engine 20, which is an example turbomachine. The gas turbine engine 20 is a two-spool turbofan having a fan section 22, a compressor section 24, a combustor section 26, and a turbine section 28. The fan section 22 drives air along a bypass flowpath. The compressor section 24 drives air along a core flowpath for compression. Compressed air is communicated into the combustor section 26 then expanded in the turbine section 28. The engine 20 generally includes a low speed spool 30 and a high speed spool 32 mounted for rotation about longitudinal axis A.

The low speed spool 30 generally includes an inner shaft 40 that rotatably couples a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that rotatably couples a high pressure compressor 52 and high pressure turbine 54. A combustor 56 is arranged between the high pressure compressor 52 and the high pressure turbine 54. The inner shaft 40 and the outer shaft 50 are coaxial and rotate about axis A.

The core airflow is compressed by the low pressure compressor 44 and the high pressure compressor 52. The compressed air is mixed with fuel in the combustor 56 and then expanded over the turbines 46, 54. The turbines 46, 54 rotationally drive the respective low speed spool 30 and high speed spool 32 in response to the expansion. Although shown as a gas turbine engine in this example, it should be understood that the concepts described herein are not limited to use with gas turbine engines as the teachings may be applied to other types of turbomachines and other devices that include geared architectures.

Figure 2:
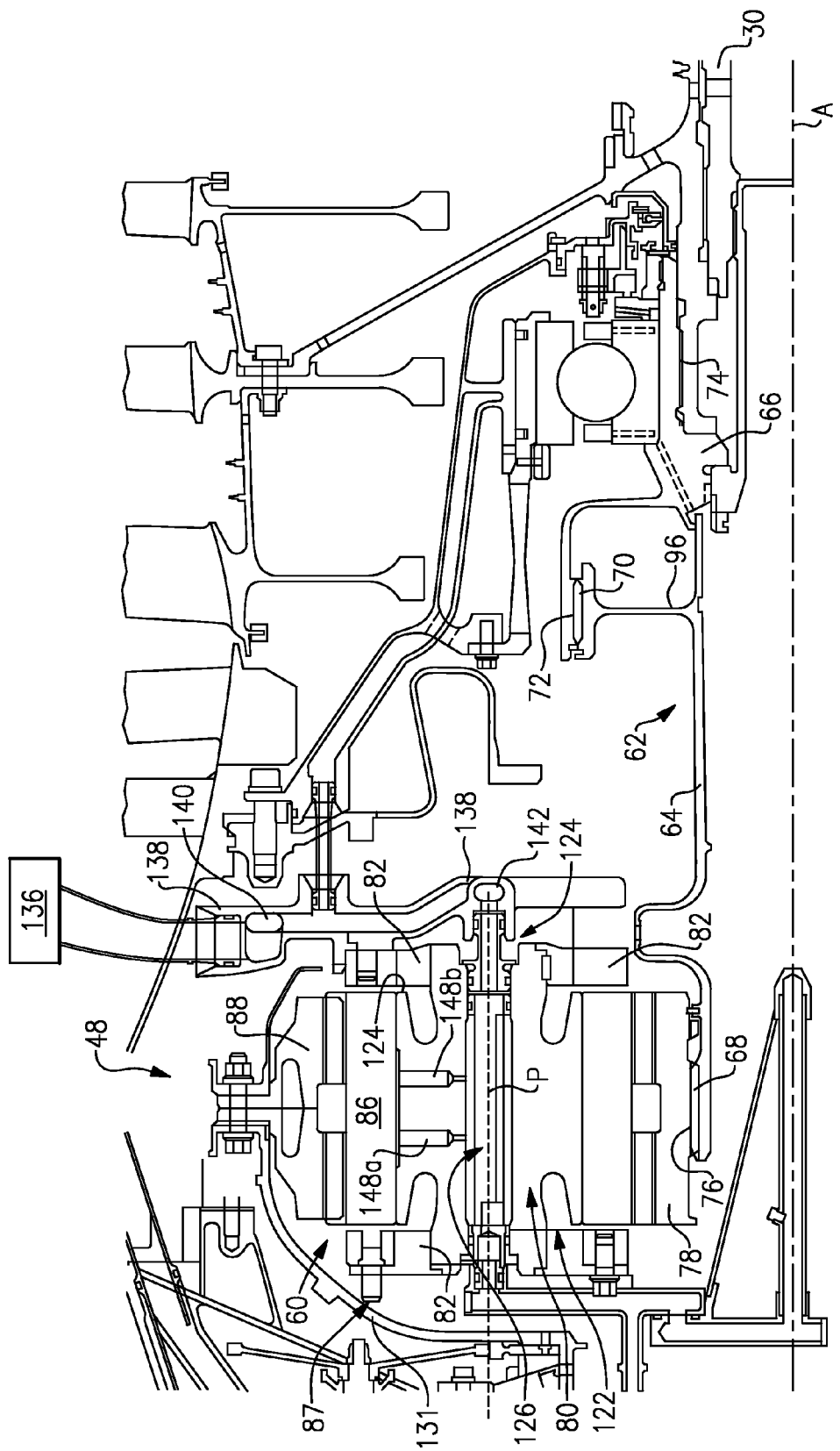
FIG. 2 is a close-up view of an epicyclic gear system within the FIG. 1 turbomachine.

With reference to FIG. 2, the example geared architecture 48 generally includes a coupling shaft assembly 62 that transfers torque from the low speed spool 30 to the geared architecture 48. The example coupling shaft assembly 62 generally includes a forward coupling shaft section 64 and an aft coupling shaft section 66. The forward coupling shaft section 64 includes an interface spline 68 and a mid shaft interface spline 70. The aft coupling shaft section 66 includes a mid shaft interface spline 72 and an interface spline 74.

The example geared architecture 48 also includes an epicyclic gear system 60 driven by the low speed spool 30 through the coupling shaft assembly 62. The interface spline 68 is joined, by a gear spline 76, to a sun gear 78 of the epicyclic gear system 60. The sun gear 78 is in meshed engagement with multiple intermediate gears, of which the illustrated star gear 86 is representative. Other examples may include other gears, such as planetary gears.

Each star gear 86 is rotatably mounted in a carrier 82 by a journal pin 80. Rotary motion of the sun gear 78 urges each star gear 86 to rotate about a respective longitudinal axis P. Journal pin 80 is held in place by locating pin 87 to allow attachment of each star gear 86 to the carrier 82. Each journal pin 80 has a pair of axial ends 122, 124 and an oil supply passage 126 extending an axial length along axis P.

An oil pump 136 is shown schematically and communicates oil to the oil track 138. The oil track 138 includes inlets 140 and cavities 142. Oil enters the oil track 138 at inlets 140 and flows into cavities 142 defined within the oil track 138. The cavities 142 communicate oil to the oil supply passage 126 of each journal pin 80 at the aft axial side 124. The cavities 142 and oil supply passage 126 are pressurized by the oil pump 136, which forces the oil to move into chambers 148a, 148b, as will be described in further detail below.

Each star gear 86 is also in meshed engagement with rotating ring gear 88, which is mechanically connected to a shaft 131. The star gears 86 mesh with both the rotating ring gear 88 and the rotating sun gear 78. The star gears 86 rotate about their respective axis P to drive the ring gear 88 to rotate about engine axis A. The rotation of the ring gear 88 is conveyed to the fan 42 (FIG. 1) through the fan shaft 131 to drive the fan 42 at a lower speed than the low speed spool 30.

Figure 3:
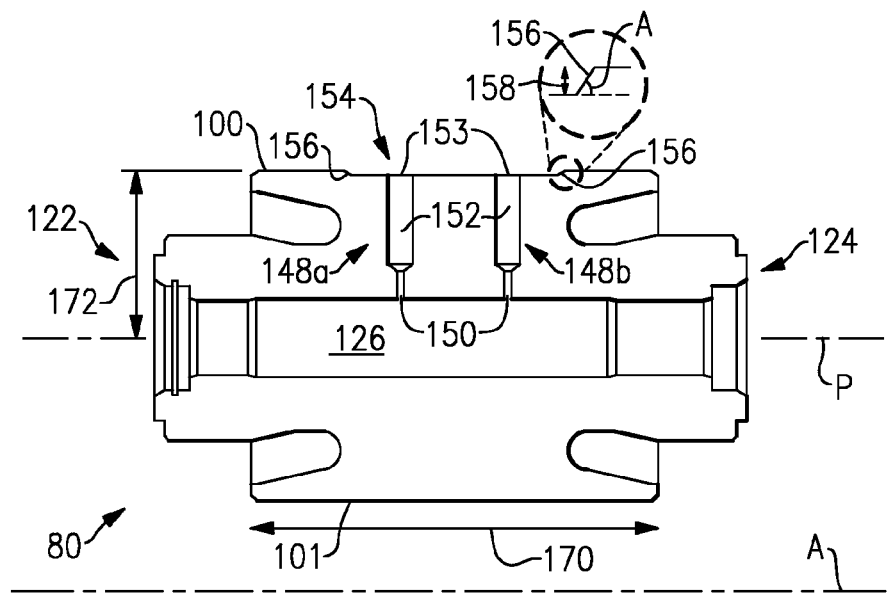
FIG. 3 is a cross-sectional view of an example journal pin.
Figure 4:
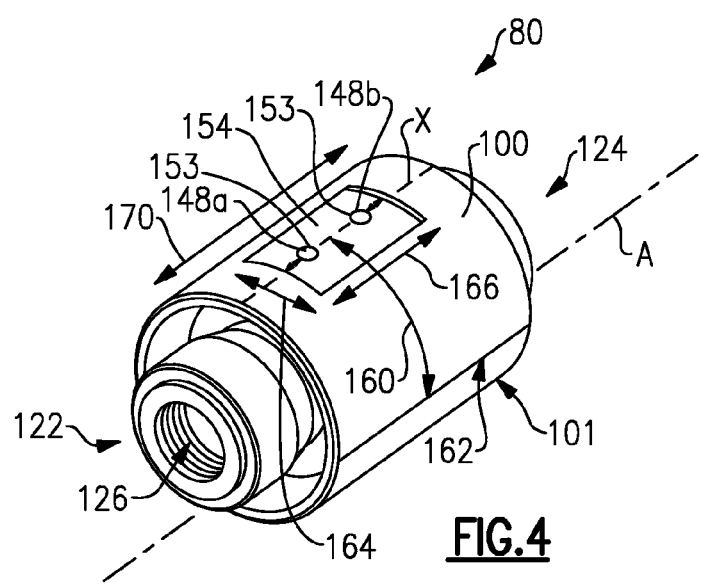
FIG. 4 is a perspective view of the example journal pin of FIG. 3.

Referring now to FIGS. 3 and 4, with continuing reference to FIG. 2, the example journal pin 80 includes a generally cylindrical body 101 having an outer circumference 100. The oil supply passage 126 extends axially from the aft axial end 124 to the fore axial end 122 along axis P. In the example journal pin 80, oil is communicated to the oil supply passage 126 from the aft axial end 124. Alternatively, oil can be communicated into the oil supply passage 126 from the fore axial end 122. The oil supply passage 126 is pressurized by the oil pump 136 (FIG. 2) such that oil in the oil supply passage 126 moves radially outward into chambers 148a, 148b.

Each example chamber 148a, 148b extends from the oil supply passage 126 to the outer circumference 100 of the journal pin 80. Each chamber 148a, 148b includes an generally cylindrical inlet section 150 and a generally cylindrical holding section 152. The inlet section 150 is sized to control flow from the oil supply passage 126 to the outer circumference 100 of each journal pin 80. The circumferential size of inlet section 150 determines a maximum oil flow rate, and is dependent on the size of the journal pin 80.

In the example journal pin 80, holding section 152 has a diameter and radial length greater than an inlet section 150. In one example, the cross sectional area of holding section 152 is 100 times the size of the area of inlet section 150. However, other configurations of a holding section 152 having a greater cross section then inlet section 150 are contemplated. Inlet section 150 communicates oil to corresponding holding section 152, where oil is able to pool before being communicated via outlets 153 to the recess 154 disposed on the outer circumference 100 of the journal pin 80. The recess 154 holds oil to be distributed between the journal pin 80 and corresponding star gear 86 for lubrication.

In one example, the recess includes axial ends 156 tapered at an angle θ of 45° relative to axis P. However, an angle θ of 40°-50° is contemplated.

The cylindrical body 101 of each journal pin 80 has an axial length 170 and a radius 172. The axial length 170 and radius 172 are determined based on the requirements of the engine 20. The recess 154 of each journal pin 80 includes a depth 158, an axial length 166, and a width 164.

In one example, the ratio of the recess depth 158 to the radius 172 of the pin 80 is between 0.02:1 and 0.05:1. In one example, the ratio of the axial length 166 of each recess 154 to journal pin axial length 170 is between 0.4:1 and 0.5:1. Each recess has a width 164 which is between 40° and 45° of the outer circumference 100.

A load plane 162 is defined on each journal pin 80 where oil pressure is the greatest on the journal pin 80, as will be described in further detail below. The holding sections 152 of respective chambers 148a, 148b are arranged such that the center of each chamber 148a, 148b, as shown by axis X, is an angle 160 between 95° and 110° from the load plane 162. Each chamber 148a, 148b is spaced from an axial end 156 of the recess 154 such that the distance between the center of each chamber 148a, 148b and axial ends 156 is 20% to 30% of the recess length 166.

The recess 154 holds oil provided from the chambers 148a, 148b, allowing the journal pin 80 to supply the oil needed between journal pin 80 and respective star gear 86. To dispose of used or excess oil, oil is pushed to the axial ends 122, 124 of the journal pin 80 and falls off the axial ends 122, 124 of the journal pin.

In one example, the chambers 148a, 148b are arranged symmetrically relative to the axial ends 156. However, the chambers 148a, 148b may also be arranged non-symmetrically to force oil to move off the journal pin 80 in a predetermined axial direction. Moving either chamber 148a, 148b in a first axial direction will force more oil to move off the journal pin 80 in the opposite second axial direction.

During operation, oil pressure on the outer circumference 100 is increasing as oil moves from the recess 154 to the load plane 162. The oil pressure is at a maximum at the load plane 162 and then begins to decrease as the oil moves around the outer circumference 100 past the load plane 162. In this example, the oil is moving in a clockwise direction; however, rotation may also occur in a counter-clockwise direction wherein the example recess 154 would be disposed the opposite side of the load plane 162. As oil moves about the outer circumference 100, it increases in temperature until it returns to the recess 154. The recess 154 pushes the heated oil moving about the outer circumference 100 to the axial ends 122, 124 of the journal pin 80 where it falls off the journal pin 80. Cool oil in the recess replaces the heated oil via viscous shearing. The heated oil that falls off the axial ends 122, 124 of the journal pin 80 then hits the fan shaft 131 (FIG. 2) and is scavenged.

The use of two chambers 148a, 148b in the example journal pin 80 allows the recess 154 to maintain a constant supply of oil even if one of the chambers 148a, 148b is blocked, or otherwise unable to provide oil from the oil supply passage 126. This allows the journal pin 80 to prevent failure during operation due to a lack of oil lubrication between the journal pin 80 and corresponding star gear 86. The pooling of oil in the recess 154 provides adequate oil supply during windmilling operation. The flow rate of oil within this configuration is also reduced, thereby reducing heat generation from excess oil being pushed off journal pins 80, which increases in temperature due to contact with other components in the engine 20. Engine 20 weight is also reduced by reduction of size of components, such as the oil pump 136, due to the decreased in oil flow rate.

Figure 5:
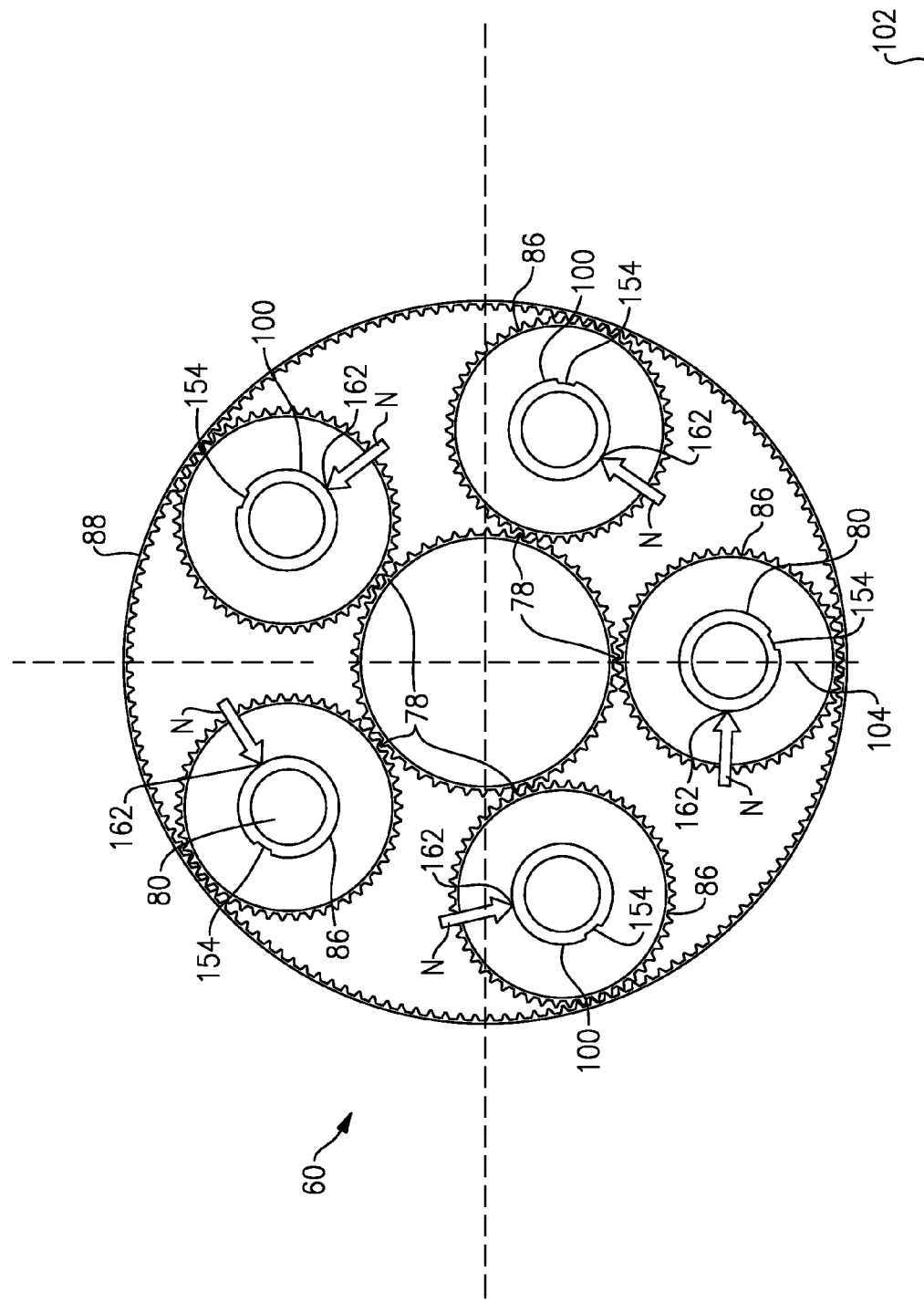
FIG. 5 is a cross sectional view of an example epicyclic gear system including the journal pin of FIG. 3.

Referring to FIG. 5, with continued reference to FIGS. 2-4, rotating the sun gears 78 causes the star gears 86 to rotate around their respective journal pins 80. The example star gears 86 remain in the same circumferential position relative to the sun gear 78 while rotating. In this example, there are five star gears 86 radially oriented about the sun gear 78. However, more or fewer star gears 86 may be used. Also, the star gears 86 are equally circumferentially spaced about the sun gear 78. However, other orientations may be used.

As the sun gear 78 and ring gear 88 rotate, a force is applied to each star gear 86. The force applies a normal load, illustrated by arrows N to each journal pin 80 along the axial length of the journal pin 80. The direction of the normal load N applied to each journal pin 80 is determined based upon the orientation of each journal pin 80 relative to the sun gear 78.

As the normal load N is applied during operation, it provides the greatest oil pressure on load plane 162. The center of each recess 154 of respective journal pin 80 is offset by the angle 160 between 95° and 110° from the load plane 162. The recess 154 is circumferentially offset in a direction opposite the direction of rotation of corresponding star gear 86.

Referring to FIG. 6, a method of installing an epicyclic gear system in a turbomachine 202 includes supporting a first intermediate gear with a journal pin having a supply passage in fluid communication with a recess through a first chamber and a second chamber 204. The first chamber and second chamber are each radially outward of the supply passage and each of the first chamber and second chamber have a first section radially inward of a second section. In each chamber, a cross sectional area of the second section is greater than a cross sectional area of the first section. The journal pin is oriented so that the recess is circumferentially offset from a load plane of the journal pin 206. The journal pins and corresponding intermediate gears are rotated around the sun gear using a tool (not shown) inserted into the first journal pin. The corresponding intermediate gears are oriented relative to the first intermediate gear (See FIG. 5) about the sun gear. The intermediate gears form at least part of the epicyclic gear system 60 (See FIG. 2) which is attached to low speed spool 30 such that the sun gear 78 rotates with the low speed spool 30.

Various non-limiting embodiments are disclosed herein, however, one of ordinary skill in the art would recognize that various modifications and variations in light of the above teachings will fall within the scope of the claims. For that reason, the following claims should be studied to determine their true scope and content.

What is claimed:

1. A journal pin comprising:
   a generally cylindrical body disposed about an axis having a supply passage;
   a first chamber and a second chamber disposed in the generally cylindrical body in fluid communication with the supply passage; and
   a recess on an outer diameter of the cylindrical body in fluid communication with the first chamber and the second chamber, wherein the first chamber and second chamber are each radially outward of the supply passage and include an outlet to the recess, each of the first chamber and second chamber having a first section radially inward of a second section, wherein a cross sectional area of the second section is greater than a cross sectional area of the corresponding first section, wherein a ratio of an axial length of the recess to an axial length of the body is between 0.4:1 and 0.5:1.

2. The journal pin of claim 1, wherein a ratio of a radial depth of the recess to a radius of the cylindrical body is between 0.02:1 and 0.05:1.

3. The journal pin of claim 1, wherein the first chamber and the second chamber are symmetrically aligned relative to axial ends of the recess.

4. The journal pin of claim 1, wherein the first chamber and the second chamber are non-symmetrically aligned relative to axial ends of the recess.

5. The journal pin of claim 1, wherein a first axial and second axial end of the recess are tapered.

6. The journal pin of claim 5, wherein the taper of the first axial end and second axial end of the recess is at an angle between 40° and 50°.

7. The journal pin of claim 1, wherein the recess has a width between 40° and 45° of the outer circumference.

8. The journal pin of claim 1, wherein the distance between the center of the first chamber and the center of the second chamber and an axial end of the recess is 20% to 30% of an axial length of the recess.

9. The turbomachine epicyclic gear system of claim 1, wherein the ratio is selected such that the recess pushes heated lubricant moving about the outer circumference of the journal pin towards an axial end of the journal pin.

10. A turbomachine epicyclic gear system comprising:
    a sun gear rotatable around an axis;
    a ring gear radially outward of the sun gear;
    a plurality of intermediate gears meshed with the sun gear and the ring gear; and
    a plurality of journal pins each configured to support one of the plurality of intermediate gears, each of the plurality of journal pins having a supply passage in fluid communication with a recess disposed on the outer circumference of each journal pin through a first chamber and a second chamber disposed in each of the plurality of journal pins, wherein the first chamber and second chamber are each radially outward of the supply passage and have an outlet to the recess, each of the first chamber and second chamber having a first section radially inward of a second section, wherein a cross sectional area of the second section is greater than a cross sectional area of the corresponding first section, wherein the first chamber and the second chamber are non-symmetrically aligned relative to axial ends of the recess.

11. The turbomachine epicyclic gear system of claim 10, wherein each journal pin has a load plane circumferentially aligned with a normal load applied to the journal pins, wherein the normal load is perpendicular to the axis.

12. The turbomachine epicyclic gear system of claim 11, wherein a center of the first chamber and a center of the second chamber are between 95° and 110° circumferentially offset from the load plane.

13. The turbomachine epicyclic gear system of claim 11, wherein a lubricant moves counter clockwise about the outer circumference in response to the location of the recess relative to the load plane, wherein the load plane is configured to be circumferentially aligned with a normal load applied to the journal pin, wherein the normal load is configured to be perpendicular to the axis, wherein a center of the first chamber and a center of the second chamber are between 95° and 110° circumferentially offset from the load plane.

14. The turbomachine epicyclic gear system of claim 10, wherein the cross sectional area of the second section is 100 times the cross sectional area of the first section.

15. The turbomachine epicyclic gear system of claim 10, wherein an oil track is in fluid communication with the supply passage to communicate oil from an oil source to the supply passage.

16. The turbomachine epicyclic gear system of claim 15, wherein the oil track supplies oil to the supply passage at an axially aft end of the supply passage.

17. The turbomachine epicyclic gear system of claim 10, wherein the epicyclic gear system includes five intermediate gears circumferentially spaced equally about the sun gear.

18. The turbomachine epicyclic gear system of claim 10, wherein each journal pin attaches the corresponding intermediate gear to a carrier, the corresponding intermediate gear configured to rotate relative to the journal pin.

19. The turbomachine epicyclic gear system of claim 10, wherein the sun gear is rotatably driven by a low speed spool.

20. The turbomachine epicyclic gear system of claim 10, wherein a ratio of an axial length of the recess to an axial length of the body is between 0.4:1 and 0.5:1.

21. A method for assembling an epicyclic gear system in a turbomachine comprising:
supporting a first intermediate gear with a journal pin having a supply passage in fluid communication with a recess through a first chamber and a second chamber disposed in the journal pin, wherein the first chamber and second chamber are each radially outward of the supply passage, each of the first chamber and second chamber having a first section radially inward of a second section, wherein a cross sectional area of the second section is greater than a cross sectional area of the corresponding first section, wherein a ratio of an axial length of the recess to an axial length of the body is between 0.4:1 and 0,5:1; and
orienting the journal pin such that the recess is circumferentially offset from a load plane of the journal pin.

22. The method of claim 21, further comprising inserting the first intermediate gear and a plurality of additional intermediate gears onto the epicyclic gear system.

23. The method of claim 22, further comprising attaching the epicyclic gear system to communicate with a low pressure turbine shaft such that the sun gear rotates with the low pressure turbine shaft.

24. The method of claim 23, further comprising orienting a plurality of additional intermediate gears with corresponding journal pins relative to the orientation of the first intermediate gear.

25. The method of claim 21, wherein a lubricant moves counter clockwise about the outer circumference in response to the location of the recess relative to the load plane, wherein the load plane is configured to be circumferentially aligned with a normal load applied to the journal pin, wherein the normal load is configured to be perpendicular to the axis, wherein a center of the first chamber and a center of the second chamber are between 95° and 110° circumferentially offset from the load plane.

26. The method of claim 21, wherein the first chamber and the second chamber are non-symmetrically aligned relative to axial ends of the recess.

* * * * *